United States Patent [19]

Fuchs

[11] Patent Number: 4,972,622
[45] Date of Patent: Nov. 27, 1990

[54] ALARM FOR INDICATING FISH STRIKING BAIT

[76] Inventor: Richard Fuchs, Lot 9, Seabolt Estates, Hinton, Alberta, Canada, T0E 1B0

[21] Appl. No.: 375,962
[22] Filed: Jul. 6, 1989
[30] Foreign Application Priority Data
 Jul. 7, 1988 [CA] Canada .................................. 571408
[51] Int. Cl.⁵ ............................................ A01K 97/12
[52] U.S. Cl. .......................................... 43/17; 43/21.2
[58] Field of Search .................... 43/17, 21.2; 248/530, 248/533

[56] References Cited
U.S. PATENT DOCUMENTS

| | | | |
|---|---|---|---|
| 3,646,697 | 3/1972 | Jennings | 43/21.2 |
| 3,903,633 | 9/1975 | Hutcherson | 43/21.2 |
| 4,142,316 | 3/1979 | Greer et al. | 43/17 |
| 4,154,015 | 5/1979 | Holland | 43/17 |

Primary Examiner—Richard K. Seidel
Assistant Examiner—James Miner
Attorney, Agent, or Firm—Mirek A. Waraksa

[57] ABSTRACT

An alarm for indicating when a fish strikes bait at the end of a line associated with a fishing rod. The alarm includes a plastic housing defining a receptacle with a rim and opening through which the fishing rod is and a separate compartment where a sound generating unit is stored. A movable receptacle part is integrally hinged to the housing and in a rest position defines a part of the rim against which the rod is rested. The receptacle part is deflected outwardly to a strike position when the fish takes bait, but is otherwise restored to the rest position by the resilience of the plastic forming the hinge. The sound generating unit is mounted on a plastic carrier which has a pair of prominent terminals connected to a speaker drive circuit. A pair of conductive clip elements within the compartment serve both to retain the carrier in a releasable snap fit and to electrically contact the circuit through the carrier terminals. A movable contact attached to the displaceable receptacle part and a stationary contact mounted on the housing are attached to the clip elements. The movable contact is separated by an air gap from the stationary contact when the displaceable receptacle part is the rest position, but contacts the stationary contact when the receptacle part is deflected to the strike position, thereby closing the circuit and generating an audible alarm system.

13 Claims, 2 Drawing Sheets

ALARM FOR INDICATING FISH STRIKING BAIT

FIELD ON THE INVENTION

The invention relates to alarm devices for indicating that a fish has taken bait at the end of a line associated with a fishing rod.

DESCRIPTION OF THE PRIOR ART

Alarm devices for indicating when a fish strikes bait have been proposed. These generally comprise structure which attaches to the shaft associated with the fishing rod and which responds to bending of the rod to generate an alarm signal. Such devices are obtrusive and complicated, and it would be desirable to provide a much simpler mechanism for indicating that a fish strikes bait and not requiring direct attachment to a rod.

SUMMARY OF THE INVENTION

It is an object of the invention to provide an alarm for indicating that a fish has taken bait at the end of a fishing line including a receptacle adapted to releasably receive a handle or end portion of a fishing rod.

It is another object of the invention to provide such an alarm with a simple alarm generating mechanism which involves deflection of portion of the receptacle defining part of a rim surrounding the opening through which the portion of the fishing rod is received.

It is object of the invention in a preferred embodiment to provide a receptacle with essentially an integral construction in which an integrally hinged portion of the receptacle deflects and responds to fish striking bait and in which an electric circuit is actuated in response to such deflection to generate an audible alarm signal.

These and other objects will be apparent from a description of preferred embodiment below.

In one aspect, the invention provides an alarm having a housing which defines a receptacle. The receptacle has a rim and an opening through which the fishing rod can be received along predetermined axis. The receptacle includes a displaceable receptacle portion which in a rest position defines part of the rim and against which the fishing rod can be rested. Biasing means are provided for restoring the displaceable receptacle portion to the rest position, but the receptacle portion can be displaced away from the rest position to a strike position, as in response to forces applied transverse to the rod when a fish takes bait. A sound generating unit is mounted in the interior of the housing. The sound generating unit includes a sound generator and an appropriate electric actuating circuit. The circuit is normally open to disable sound generation. The electric circuit is preferably rendered "open" by providing an incomplete power path to an associated battery, but any other means which effectively open a conduction path to prevent sound generation are appropriate. A contact element moves with the displaceable receptacle portion and closes the electric circuit for sound generation whenever the displaceable receptacle portion is moved to the strike position. In preferred form, means are provided which permit adjustment or selection of the strike position. Lastly, means are provided for securing the housing to an external support means. Such securing means may be in the form of a tapered stake which is insertable into soil to maintain the receptacle in a generally vertical orientation, but may also be alternative clamping means which can releasably secure the housing to the side of a small fishing craft or any other appropriate external support means.

Other aspects of the invention will be apparent from a description of a preferred embodiment below and will be more specifically defined in the appended claims.

DESCRIPTION OF THE DRAWINGS

The invention will be better understood with reference to drawings in which.

DESCRIPTION OF PREFERRED EMBODIMENT

The drawings illustrate a preferred embodiment of an alarm for indicating when a fish strikes bait at the end of a line (not illustrated) associated with a fishing rod 10 (extensively fragment and in phantom outline).

Figures 1, 2:
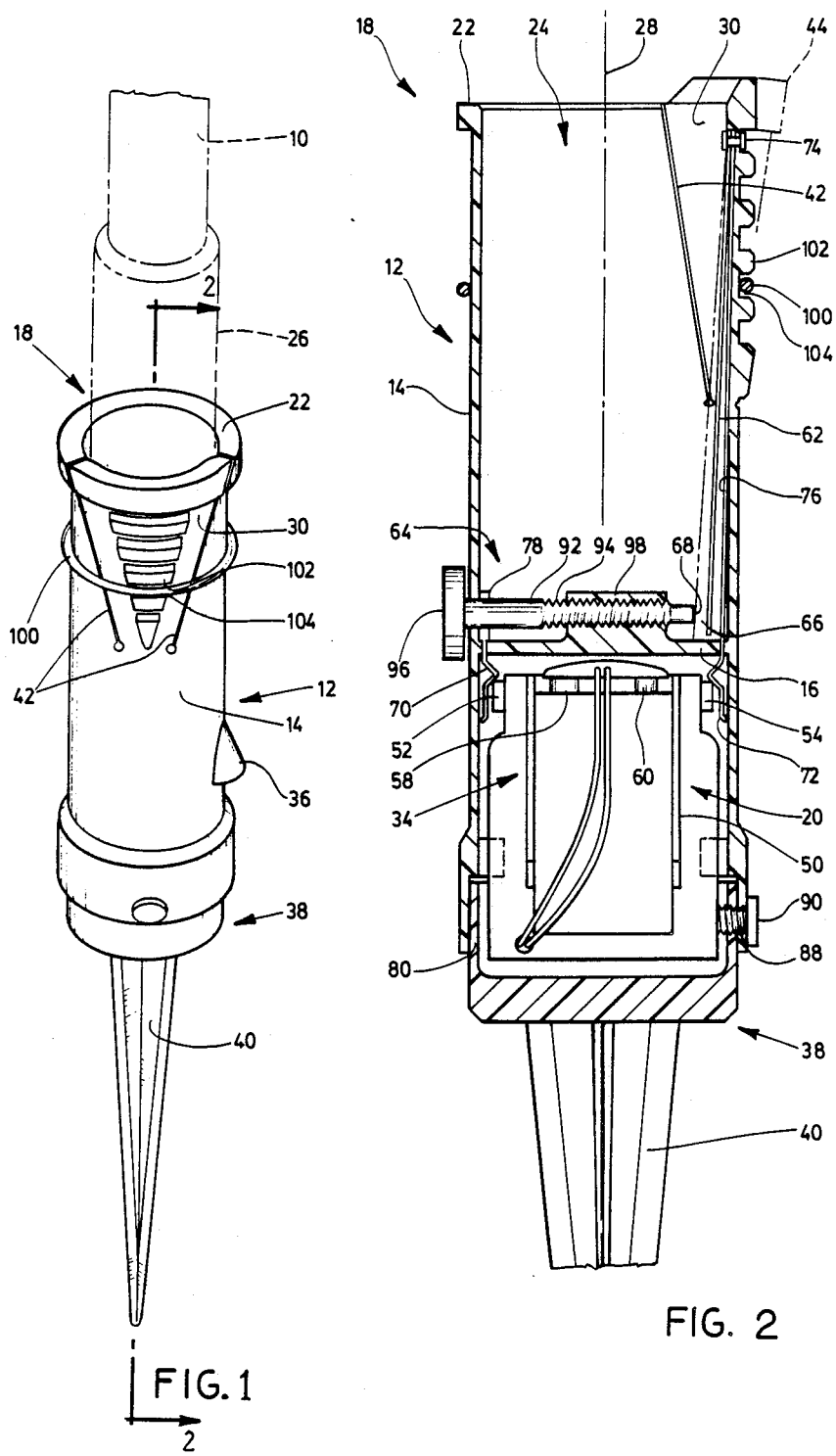
FIG. 1 is a perspective view of a preferred embodiment of a fishing alarm and an extensively fragmented fishing rod shown in phantom outline.
FIG. 2 is a cross-sectional view along the lines 2—2 of FIG. 1.

The alarm includes a plastic housing 12 with a circumferential sidewall 14 and an internal partition 16 transverse to the sidewall 14. The sidewall 14 and the internal partition 16 together define a generally cylindrical receptacle 18 and a compartment 20 axially-spaced from the receptacle 18. The receptacle 18 has a rim 22 and an opening 24 defined by the sidewall 14. The receptacle 18 receives a handle 26 associated with the fishing rod 10 along a central axis 28 through the receptacle opening 24, and is dimensioned to loosely retain the handle 26. In use, the handle 26 may be rested against a displaceable receptacle protion 30 which in a rest position (shown solid in FIG. 1 and 2) defines part of the receptacle rim 22.

The housing 12 has an oppositely-disposed opening 32 accessing the compartment 20. This compartment opening 32 permits a sound generating unit 34 whose components are mounted on a plastic carrier 50 to be introduced into the compartment 20. A hood 36 formed on the sidewall 14 immediately defining the compartment 20 conceals an opening through which the sound emanates. The compartment opening 32 is closed by a closure member 38 formed with a tapered stake portion 40 appropriate for supporting the housing 12 in a vertical orientation when driven into soil. Other releasable securing means can be used such as spring-biased clamp, if the alarm is to be supported from other external supporting means such as the side of a small fishing boat.

The displaceable receptacle portion 30 is generally V-shaped structure integrally formed with the sidewall 14 and effectively defined by a pair of slits 42. This arrangement defines an integral hinge with the sidewall 14, axially insert from the rim 22. The hinge permits the displaceable receptacle portion 30 to be hingedly moved outwardly relative to the axis 28 from the rest position to a strike position (illustrated in stippled outline in FIG. 2) and indicated with the reference numeral 44. The plastic constituting the housing 12 and the hinge is sufficiently resilient that it applies a force to the displaceable receptacle portion 30, when displaced from the rest position, which force is directed towards the axis 28. This restoring force tends to restore the displaceable receptacle portion 30 to the rest position, but can be overcome by forces transverse to the rod 10, such as the forces which might arise when a fish strikes bait at the end of the associated fishing line. It will be appreciated that this arrangement implements a specific aspect and object of the invention, namely, to provide a very simple and inexpensive mechanism involving deflection of an integrally formed receptacle portion 30 to initially indicate that a fish has taken bait.

The sound generating unit 34 includes a sound generator and electric driver circuit for actuating the sound generator. In the drawings, these have been collectively shown as a rectangular box indicated by a reference numeral 46, expect for a battery 48 associated with the electric circuit. The components may comprise a standard speaker element and any appropriate electric driver circuit, which being conventional and well understood in the art of sound reproduction, have not been illustrated. The components are fixed to a plastic carrier 50 which carries a pair of oppositely-disposed terminals 52, 54 in circuit with the electric circuit and which has a space for receiving the battery 48 required to power the circuit. A conventional socket 56 associated receives and electrically engages the battery terminals. The socket 56 and associated wiring coupled one battery terminal 58 to one carrier terminal 52; the other battery terminal 60 being operatively connected by the associated socket wiring in circuit with the electric driver circuit to supply power. The electric circuit is normally open to disable sound generation. In this particular embodiment of the invention, the battery power supply line associated with the electric circuit is effectively open, and is closed or completed to enable sound generation by completing a circuit between the two carrier terminals 52, 54.

An elongate, movable contact element 62 formed of a conductive metal is attached to the displaceable receptacle portion 30. Another normally stationary contact element 64 is mounted on the internal partition 16 at the bottom of the receptacle 18. The stationary contact element 64 is separated by an air gap 66 from the movable contact element 62 when the displaceable receptacle portion 30 is in the rest position. When the displaceable receptacle portion 30 is deflected to the strike position 44, the movable contact element 62 closes the electric circuit, contacting an end surface 68 of the stationary contact element 64 (as shown in stippled outline in FIG. 2). The circuit is then closed, battery power being supplied through the movable and stationary contact elements 62, 64 to enable sound generation.

The sound generating unit 34 can be very conveniently snapped into and out of the compartment 20. To the end, a pair of conductive metal clip portions 70, 72 are mounted within the compartment 20 through openings (not indicated) formed at either side of the internal partition 16 adjacent to the sidewall 14. The movable contact element 62 is connected by a rivet 74 to an elongate shank 76 associated with the clip portion 72, which rivet 74 also extends through an opening formed in the displaceable receptacle portion 30 and serves incidentally to secure the movable contact to the displaceable receptacle portion 30 for movement therewith. The stationary contact element 64 is connected to the other clip portion 70 by essentially a press fit through an opening in an expanded clip end poriton 78. The clip portions 70, 72 are positioned at diametrically-opposing sides of the compartment 20 to simultaneously engage the carrier terminals 52, 54 when the latter is appropriately inserted through the compartment opening 32. Each clip portion has a U-shaped portion which releasably receives one of the carrier terminals 52, 54. The clip portions 70, 72 releasably retain the carrier 50 by means of the carrier terminals 52, 54 and simultaneously place the movable and stationary contacts in circuit with the driver circuit and the battery 48 through the carrier terminals 52, 54. Since the carrier 50 is retained solely by the clip portions 70, 72, the sound generating unit 34 can be very easily installed or removed from the device. Two objects of significant advantage are associated with this aspect of the invention: first, assembly is greatly simplified, no special step or tools being required to install and retain the sound generating unit 34; second, sound generating units can be readily interchanged. The latter aspect permits separate sound generating units to be sold to produce the type of sound which the user desires. For example, the unit may be adapted to reproduce spoken words stored as compressed data sets in an appropriate memory unit associated with the electric circuitry.

Figure 3:
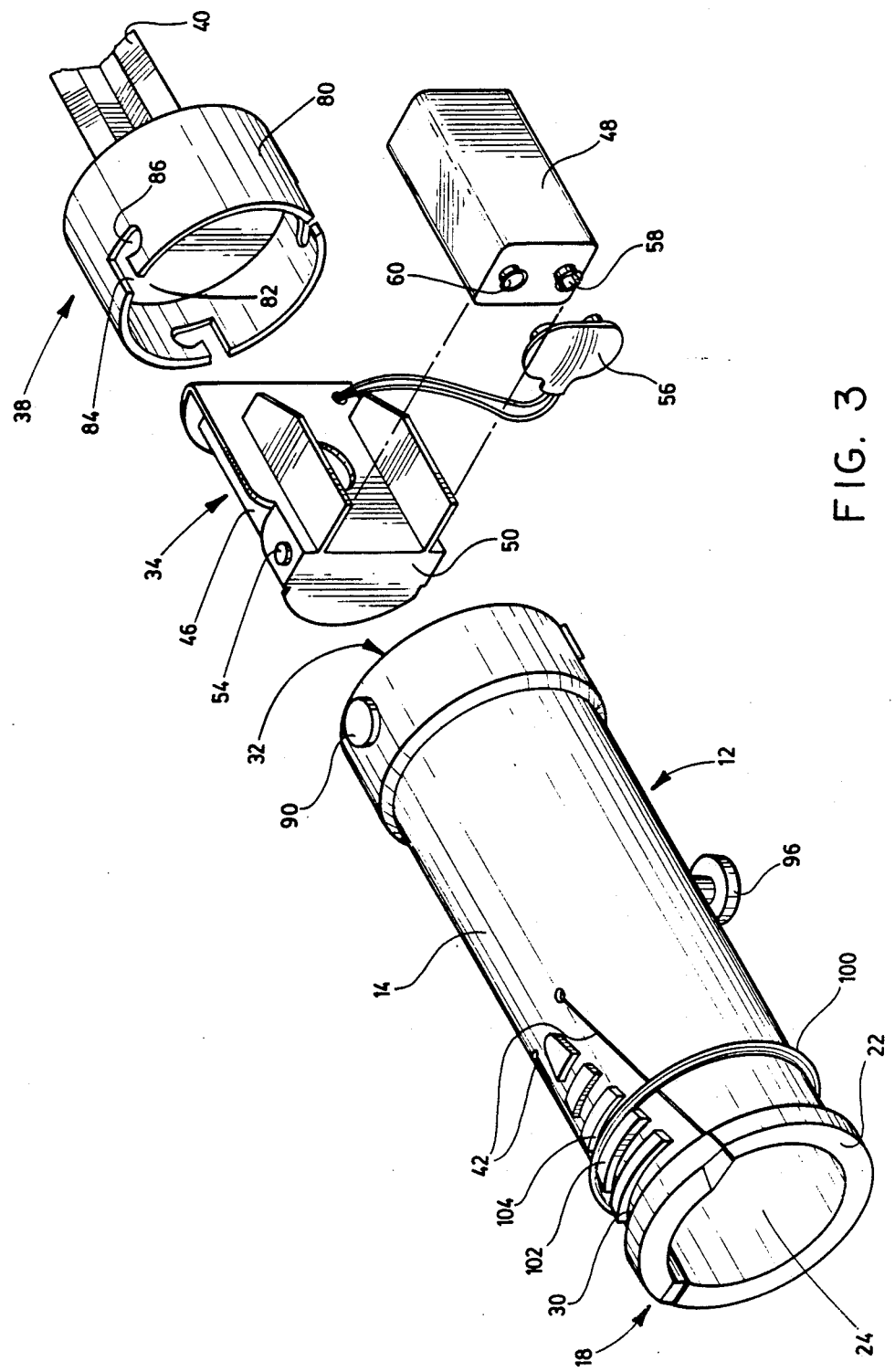
FIG. 3 is a partially-fragmented, exploded perpective view of the alarm.

The closure member 38 may be integrally formed of plastic. It has a cylindrical portion 80 from whose rear surface the stake portion 40 extends. Three recesses are equally-spaced circumferentially about a leading edge of the cylindrical portion 80. The recess 82 which is typical and best illustrated in FIG 3 has a longitudinally-directed recess segment 84 extending inwardly from the leading edge and terminated with a circumferentially-directed recess segment 86. This recess 82 receives a projection 88 (see FIG. 2) extending inwardly from the interior wall of the housing sidewall 14 inset from the compartment opening 32 where the sound generating unit 34 is otherwise received or removed. The other two recesses cooperate in a similar manner with two other internal projections (not illustrated). The closure memeber 38 is releasably secured to the housing 12 by inserting the cylindrical portion 80 in the interior of sleeve portion of expanded diameter, simultaneously engaging the three projections in the three longitudinally-directed recess segments. The closure member 38 is then rotated to effectively lock the projections at the ends of each of the circumferentially-directed segments. The projection 88 which is typical is provided by a simple bolt 90 with as short threaded shaft which cuts threads into an opening provided at appropriate locations in the sidewall 14. Integral forming of the projections with the sidewall 14 would be preferred, but may further complicate molding of the housing 12.

The operation of the alarm will be largely apparent from the foregoing description of its components. The alarm is staked in a near vertical position in soil. The handle 26 of the fishing rod 10, for example, can be inserted into the receptacle 18 through the receptacle opening 24. The receptacle 18 may be inclined slightly to ensure that the fishing rod handle 26 rest against the displaceable receptacle portion 30. When the fish strikes bait, this creates a force in the line which will normally be transverse to the rod 10 and handle 26. This force deflects the displaceable receptacle portion 30 from the rest position to the strike position 44 thereby contacting the movable contact element 62 with a stationary contact element 64. This in turn applies battery power to the sound generating unit 34 and causes audible production of an alarm signal.

In preferred form, means are provided to permit adjustment of the strike position 44 and additional biasing means are provided which permit adjustment of the amount of force required to deflect the movable receptacle portion 30. As regards the strike position 44, the stationary contact 64 will be seen to comprise a shaft 92 formed with an external screw thread 94. The shaft 92 defines the end surface 68 referred to above which confronts the movable contact 62 and which defines therewith the air gap 66. A head 96, which may be knurled to facilitate grasping, is attached to a threaded shaft 92 and located external to the housing 12. The shaft 92 cuts a thread in the interior of a raised portion 98 of the partition 16 (an appropriate clearance hole being formed in the housing sidewall 14 to permit passage of the shaft 92 and an appropriate passage being drilled in the raised portion 98). The orientation of the shaft 92 is such that rotation of the head 96 causes the end surface 68 to displace either forwards or backwards longitudinally, thereby varying the size or the air gap 66. Accordingly, the strike position 44, which is the position at which the alarm signal is generated, can be made closer or further from the rest position. It will be appreciated that in this particular embodiment of the invention the material constituting the integral hinge biases the movable receptacle portion 30 to the rest position with a biasing force which increases with the amount of deflection occuring. Accordingly, this arrangement incidentally increases the amount of force which must be applied transverse to the rod 10 to deflect the movable receptacle portion 30 to the strike position 44 and to sound the alarm.

Additional means are provided for biasing the deflectable receptacle portion 30 to the rest position and for permitting the amount of biasing torque about the hinge to be varied selectively. These biasing means include an elastomeric loop 100 which locates about the receptacle 18 and the displaceable receptacle portion 30. The movable receptacle portion 30 has a multiplicity of circumferentially-directed ribs, only one such rib being indicated with a reference numeral 102. These ribs are spaced apart to define a number of grooves such as a groove 104. These grooves effectively define a number of axially spaced-apart seating position in which the loop 100 can be releasably retained. The loop 100 tends to apply a relatively constant restoring force to the displaceable receptacle portion 30; however, depending on the groove in which the loop 100 is lodged, the resulting torque developed about the hinge is different in each of the positions. The restoring torque applied to the displaceable receptacle portion 30 can consequently be adjusted, for example, to accommodate the size or nature of the fish which is being sought.

It will be appreciated that a particular embodiment of the invention has been described and that modifications may be made therein without department from the spirit of the invention or necessarily departing from the scope of the appended claims.

I claim:

1. An alarm for indicating when a fish strikes bait at the end of a line associated with a fishing rod, comprising:
   a housing defining a receptacle having a rim and an opening surrounded by the rim, the receptacle being shaped to receive an end portion of the fishing rod along a predetermined axis through the receptacle, the receptacle having a displaceable portion which in a rest position defines part of the rim and against which the fishing rod can be rested when received in the receptacle, the receptacle portion being displaceable away from the axis from the rest position to strike position;
   biasing means associated with receptacle for restoring the displaceable receptacle portion to the rest position;
   a sound generating unit attached to the housign, the sound generating unit including a sound generator and an electric circuit for actuating the sound generator, the electric circuit normally being open to disable sound generation;
   a contact element movable with the displaceable receptacle portion, the movable contact element closing the electric circuit for sound generation whenever the displaceable receptacle protion is moved to the strike position: and,
   means attached to the housing for securing the housing to an external support means.

2. An alarm as claimed in claim 1 comprising:
   another contact element attached to the housing, the other contact element being separated by an air gap from the movable contact element when the displaceable receptacle portion is in the rest position and being contacted by the movable contact element when the displacable receptacle portion is in the strike position;
   each of the movable contact element and other contact element being electrically conductive and electrically connected to the electric circuit, the electric circuit being closed whenever the movable contact element contacts the other contact element.

3. An alarm as claimed in claim 2 comprising adjusting means for premitting the strike position to be adjusted, the adjusting means permitting the other contact element to be moved to different position to vary the size of the air gap defined between the movable contact element and the other contact element when the displaceable receptacle portion is in the rest position.

4. An alarm as claimed in claim 3 in which the other contact comprises a shaft formed with a screw thread and a head attached to the shaft and located external to the housing, the shaft having an end portion defining with the movable contact element the air gap, the shaft being threaded into a portion of the housing in an orientation such that rotation of the shaft varies the size of the air gap.

5. An alarm as claimed in claim 2 in which:
   the sound generating unit comprises a carrier on which components of the sound generating unit are mounted, the carrier having a pair of terminals fixed thereto and in circuit with the electric circuit;
   the movable contact is connected to a first conductive clip portion and the other contact element is connected to a second conductive clip portion, the first and second clip portions being located in a compartment in the interior of the housing;
   the housing has a predetermined opening through which the carrier can be inserted into or removed from the compartment;
   each of the first and second clip portions are positioned to simultaneously engage a different one of the pair of terminals when the carrier is inserted into the predetermined opening of the interior of the housing, the clip portions being shaped to electrically contact and to releasably retain the pair of electric terminals when engaged with the pair of electric terminals the sound generating unit being attached to the housing solely by means of the pair of clip portions.

6. An alarm as claimed in claim 5 in which the electric circuit includes a battery, the battery having one battery terminal connected directly to the electric circuit and another battery terminal connected to one of the terminals of the carrier such that no power is delivered by the battery to the electric circuit while the air gap is maintained between the movable contact element and the other contact element, the battery supplying power through the movable and other contact elements to the electric circuit when the movable contact element contacts the other contact element.

7. An alarm as claimed in claim 1 in which the receptacle has a circumferential sidewall and the displaceable receptacle portion is integrally formed with the sidewall, the displaceable receptacle portion forming an integral hinge with the sidewall at a location axially spaced from the rim of the receptacle, the biasing means being constituted by the material forming the integral hinge, the material being sufficiently resilient that the material applies a force to the displaceable receptacle portion whenever the displaceable receptacle portion displaced from the rest position towards the strike position, the force urging the displaceable receptacle portion towards the rest position.

8. An alarm as claimed in claim 7 comprising an elastomeric loop, the housing having means defining a multiplicity of positions at which the elastomeric loop can be releasably retained around the receptacle, the elastomeric loop engaging the displaceable receptacle portion in each of said positions to apply a force to the displaceable portion directed towards the axis, the multiplicity of positions being axially-spaced apart such that the torque about the hinge developed in response to the force applied by the elastomeric loop is different in each of the positions.

9. An alarm as claimed in claim 1 in which the securing means comprise a tapered stake portion whereby the housing may be secured in soil.

10. An alarm for indicating when a fish strikes bait at the end of a line associated with fishing rod, comprising:
a housing having a circumferential sidewall and an internal partition transverse to the sidewall, the sidewall and the internal partition defining a receptacle and a compartment axially spaced from the receptacle, the sidewall defining a rim and an opening associated with the receptacle and another oppositely-disposed opening accessing the compartment;
the receptacle being shaped to receive and retain the fishing rod along a predetermined axis through the associated receptacle opening, the receptacle having a displaceable recaptacle portion which is integrally formed with the sidewall and which in a rest position defines part of the rim;
the displaceable receptacle portion forming an integral hinge with the sidewall axially inset from the rim, the hinge permitting the displaceable receptacle portion to be hingedly moved outwardly relative to the axis from the rest position to a strike position, the hinge being formed of a material sufficiently resilient that the material applies a force to the displaceable receptacle portion at least when the displaceable receptacle portion is displaced from the rest position towards the strike position which force tends to restore the displaceable receptacle portion to the rest position;
a sound generating unit mounted in the compartment, the sound generating unit including a sound generator and an electric circuit for actuating the sound generator, the electric circuit normally being open to disable sound generation, the sound generating unit including a carrier on which components of the sound generating unit are mounted, the carrier having a pair of terminals fixed thereto and in circuit with the electric circuit;
a movable conductive contact element attached to and movable with the displaceable receptacle portion and another conductive contact element attached to the housing, the other contact element being separated by an air gap from the movable contact element when the displaceable receptacle portion is in the rest position and being contacted by the movable contact element when the displaceable receptacle portion is in the strike position;
the movable contact being connected to a first conductive clip portion located within the compartment and the other contact element being connected to a second conductive clip portion located within the compartment, each of the first and second clip portions being positioned to simultaneously engage a different one of the pair of terminals when the carrier is inserted into the compartment through the oppositely-disposed opening, the clip portions being shaped to electrically contact and to releasably retain the pair of electric terminal when engaged with the pair of electric terminal, the sound generating unit being attached to the housing solely by means of the pair of clip portions;
the electric circuit being closed and generating sound whenever the moveable contact element contacts the other contact element;
means releasably attached to the housing for closing the oppositely-disposed opening and for securing the housing to an external support means.

11. An alarm as claimed in claim 10 comprising adjusting means for permitting the strike position to be adjusted, the adjusting means permitting the other contact element to be moved to different positions to vary the size of the air gap defined between the movable contact element and the other contact element when the displaceable receptacle portion is in the rest position.

12. An alarm as claimed in claim 11 in which the other contact element comprises a shaft formed with a screw thread and a head attached to the shaft and external to the housing, the shaft having an end portion defining with the movable contact element the air gap, the shaft being threaded into a portion of the housing in an orientation such the rotation of the shaft varies the size of the air gap.

13. An alarm as claimed in claim 10 in which the electric circuit includes a battery, the battery having one battery terminal connected directly to the electric circuit and another battery terminal connected to one of the terminals of the carrier such that no power is delivered by the battery to the electric circuit while the air gap is maintained between the movable contact element and the other contact element, the battery supplying power through the movable and other contact elements to the electric circuit when the movable contact element contacts the other contact element.

* * * * *